(12) United States Patent
Walker et al.

(10) Patent No.: US 12,363,540 B1
(45) Date of Patent: *Jul. 15, 2025

(54) EMERGENCY RESPONSE SYSTEM (71) Applicants: Marion Kelly Walker, Rogers, AR (US); David Lee McClure, Rogers, AR (US)

(72) Inventors: Marion Kelly Walker, Rogers, AR (US); David Lee McClure, Rogers, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,341

(22) Filed: Jun. 6, 2023

Related U.S. Application Data (63) Continuation-in-part of application No. 16/829,158, filed on Mar. 25, 2020, now Pat. No. 11,671,431.

(51) Int. Cl.
G06Q 30/00 (2023.01)
G06Q 50/163 (2024.01)
H04W 12/30 (2021.01)

(52) U.S. Cl.
CPC .......... *H04W 12/30* (2021.01); *G06Q 50/163* (2013.01)

(58) Field of Classification Search
CPC .. G06K 7/1413; G06K 7/1417; G06Q 50/265; G06Q 20/18; G06Q 20/3276; H04W 12/06; H04W 12/086; H04L 63/0876
USPC .............................. 726/4; 235/385, 380, 382
See application file for complete search history.

(56) References Cited

U.S. PATENT DOCUMENTS

| | | | | |
|---|---|---|---|---|
| 5,596,652 A * | 1/1997 | Piatek | ................... | A62B 99/00 |
| | | | | 382/313 |
| 9,761,096 B2 * | 9/2017 | McMahan | .............. | G08B 25/08 |
| 11,671,431 B1 * | 6/2023 | Walker | ................. | G06Q 50/265 |
| | | | | 726/4 |
| 2009/0276413 A1 * | 11/2009 | Uchida | ................. | G06F 16/381 |
| | | | | 707/999.005 |
| 2016/0092959 A1 * | 3/2016 | Gross | ................. | G06Q 30/0625 |
| | | | | 705/26.62 |
| 2018/0349581 A1 * | 12/2018 | Ramalingam | ......... | H04L 63/205 |
| 2019/0311341 A1 * | 10/2019 | Rice | ........................ | G06F 3/011 |
| 2019/0318122 A1 * | 10/2019 | Hockey | .............. | G06Q 20/3221 |

\* cited by examiner

*Primary Examiner* — Daniel St Cyr
(74) *Attorney, Agent, or Firm* — Schrantz Law Firm, PLLC; Stephen D. Schrantz (57) ABSTRACT

The emergency response system and property reporting system provide a unique property identifier accessible at a property outside of a building or other structure. A user scans the property identifier with a mobile computing device to identify the property. The mobile computing device transmits the property ID and user authentication data to the server to authenticate and authorize the user. The server provides the user with the requested property data if the server authorizes the access by the user. The server also notifies a property contact that a user has scanned the property identifier of the property.

9 Claims, 5 Drawing Sheets

EMERGENCY RESPONSE SYSTEM

CROSS-REFERENCE TO RELATED APPLICATIONS

This application claims priority to and is a continuation in part of U.S. patent application Ser. No. 16/829,158 filed on Mar. 25, 2020 entitled EMERGENCY RESPONSE SYSTEM that issued as U.S. Pat. No. 11,671,431 on Jun. 6, 2023, which is hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates generally to an emergency response system, property coding system, code officials, and first responders. The emergency response system provides first responders, emergency personnel, and other authorized personnel with property data, that includes, but is not limited to environmental conditions, hazards, floor plans, contact information, and other location data. Such data is accessible through a mobile computing device, including but not limited to, a smart phone, a tablet, etc. Such data provides first responders, emergency personnel, and other personnel with additional data to respond to the emergency.

II. Description of the Known Art

Patents and patent applications disclosing relevant information are disclosed below. These patents and patent applications are hereby expressly incorporated by reference in their entirety.

U.S. Pat. No. 5,596,652 issued to Piatek on Jan. 21, 1997 ("the '652 patent") teaches a system and method for accounting for personnel at a site and system and method for providing personnel with information about an emergency site. The '652 patent teaches that the site information is all encoded in a number of two-dimensional bar codes on one or more sheets as shown in FIG. 5 of the '652 patent. The '652 patent teaches that the site information that may be contained in two-dimensional bar codes includes floor plans, blueprints, photographs of interior portions of the site, fire inspection reports, material safety data sheets (MSDS), spill abatement procedures, Tier Two reports, and locations and identification of stored hazardous materials, utility shut-offs, and gas lines. The '652 patent also teaches that any other information regarding the site that may be beneficial to emergency personnel may be contained in two-dimensional bar codes.

U.S. Pat. No. 9,761,096 issued to McMahan on Sep. 12, 2017 ("the '096 patent") teaches an active exit system that may include one or more active exit signs, each exit sign having at least one sensor, a display, and a transceiver. Each active exit sign taught by the '096 patent monitors building environmental conditions, monitors the locations of users and objects within the building, and assists in location services during normal operation. The exit signs taught by the '096 patent transmit a dynamic exit plan to a user's electronic device based on the user's location. In response to sensing an emergency event, the exit sign transmits an emergency signal to the user's electronic device and updates a user's exit plan as needed based on the location of the emergency event. The exit sign taught by the '096 patent also transmits user location information to emergency responders.

Certain problems exist with the known art. The known art requires physically locking the review site information within a lockbox. The known art requires individual bar codes that provide each specific site information on an individual bar code. Accessing the lockbox and individual bar requires valuable time that can be used in responding to the emergency. The known art does not limit access based upon the user and the geographic location. The known art provides the information to any available user. The known art also does not prioritize the information by user. The known art does not allow users to upload property data concerning a property. The known art also does not alert a property contact when a user accesses a property identifier.

SUMMARY OF THE INVENTION

The present invention relates to an emergency response system and property reporting system. The present invention provides a unique property identifier accessible on a property without entry of a building or other structure. The property identifier may be provided as a sticker, sign, label, bar code, QR code, that is accessible exterior of a building or other structure. The property identifier is not stored within a lockbox or other locked container. The property identifier is accessible exterior of a building or other structure to allow the user to access the property identifier without entering the building/structure or unlocking a container or other housing.

The user scans the property identifier with a mobile computing device, including but not limited to, a mobile phone, a smart phone, a tablet, or other mobile computing device. Scanning the property identifier allows the mobile computing device to identify the property. In one embodiment, the mobile computing device is running an application, such as software or other computer code, when scanning the property identifier. The application of the mobile computing device transmits the property ID from the property identifier to the server.

The mobile computing device also transmits user authentication data, such as an access ID. The server identifies the user via the user authentication data, such as the access ID that may include, but is not limited to a user login, application ID, device ID, biometric data, an authentication token, or other authentication data. The server identifies the user to determine if the user has access to the data associated with the property.

The system provides access to the data based upon the geographic location of the property. One embodiment restricts access to those users authorized to access properties within the geographic area. In one embodiment, the system restricts users to an authorized jurisdiction. Each property is associated with a geographic location. The server determines if the user accessing the property data associated with the property identifier has the proper authority to access the property data. The server may restrict the property data to those users authorized by geographic location.

It is an object of the present invention to provide a property identifier accessible outside of a building, structure, or other locked container.

It is an object of the present invention to provide data to authorized users.

It is another object of the present invention to identify important aspects of the property to the user in a timely manner.

It is another object of the present invention to prioritize the data provided to the user.

It is another object of the present invention to provide contact information to the user to allow the user to contact the property contact.

It is another object of the present invention to restrict the data accessible to the user.

It is another object of the present invention to restrict the users that can access the data.

It is another object of the present invention to serve as a document cabinet for a building, such as a document cabinet that is compliant with NFPA 72.

It is another object of the present invention to electronically store and provide access to documents required by NFPA 72.

It is another object of the present invention to allow the user to access logs, reports, property plans, plans, building plans, code violations, hazards of concern, action plans, inspection reports, record documentation, system record documents, fire alarm system (FAS) documentation (manuals, the system's test and certified inspection documents, service records, manuals, and AS built documents and drawings), life safety documents and reports, building documents, alarm documents, sprinkler documents, signaling system documents, emergency communications system (ECS) documentation, uploaded data from other users, and other property data.

It is another object of the present invention to alert a property contact that a user is accessing the property data of the property associated with the property contact.

It is another object of the present invention to upload data to the server and associate the uploaded data with the Property ID These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
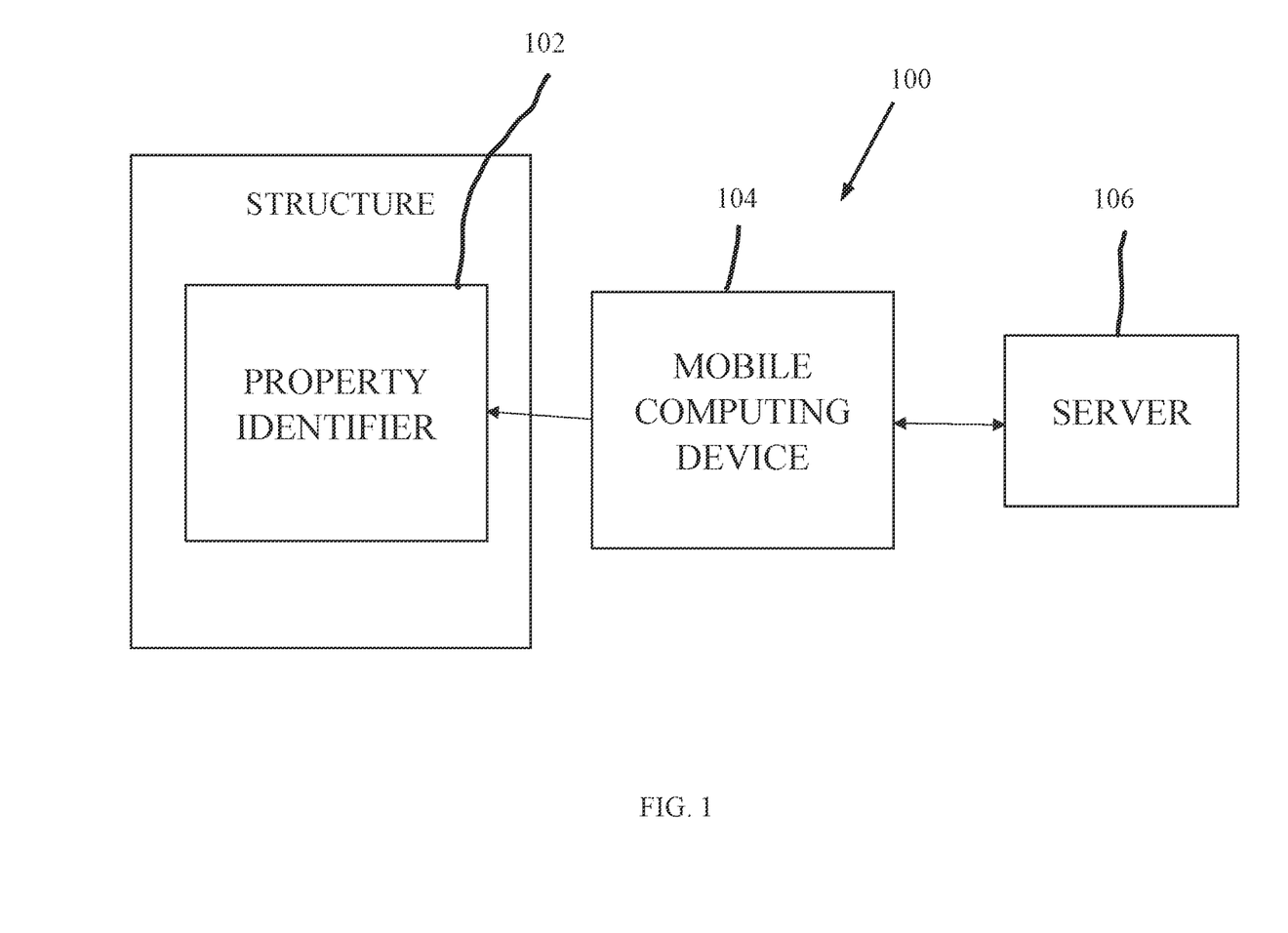
FIG. 1 is an environmental view of one embodiment of the present invention.

Referring to FIG. 1, the emergency response system, generally shown as 100, provides a property identifier 102. The property identifier provides a unique Property ID that identifies the property. The property identifier may be a sign, sticker, label, sheet, screen, printed matter, or other medium capable of showing the Property ID. The Property ID may include, but is not limited to, a bar code, a QR code, or other unique machine readable code. The property identifier is placed in an accessible location for users to scan the Property ID on the property identifier. The property identifier may be placed outside of a building, in a front lobby, near a fire alarm system, at or near a fire alarm control unit, at or near a sprinkler system control unit, at a building entrance, or other accessible location.

The user scans the Property ID with a mobile computing device 104. The mobile computing device 104 may include, but is not limited to, a phone, a smart phone, a tablet, or other mobile computing device. The mobile computing device 104 provides a camera or bar code reader.

The mobile computing device 104 also accesses the network to communicate with the server 106. The mobile computing device 104 may access the network via WIFI, cellular data, or other network. The mobile computing device 104 transmits and receives data to and from the server 106. The mobile computing device may communicate with the server using the internet, cellular, multi-drop bus (MDB) interface, USB, Bluetooth, WIFI, Ethernet, electrical signals, acoustic signals, visual signals, other standard computer communication interfaces, or the like.

The system 100 of one embodiment operates in an application, such as software, on the mobile computing device. The application submits the user authentication data to the server. The application may submit an Access ID, such as a token, application ID, device ID, or other authentication device. The server authenticates the user authentication data and transmits the property data to the application if the server approves and grants access to the property data. The user views the property data on the application.

The user installs the application on the mobile computing device. The system, such as through the server, sends each user a link to install the application on the user's mobile computing device via such user authentication data as a unique Application ID or Device ID associated with the user and the mobile computing device. The server associates the application with the user and the mobile computing device. The system can then authenticate the user via the application running on the mobile computing device. The system can also limit the area from which the user can access the property data.

The system 100 stores the property data locally and/or remotely. In one embodiment, the system 100 stores the property data on server 106. The mobile computing device 104 transmits the Property ID from the property identifier to the server 106. The communication may be wireless or wired, preferably wireless.

The server 104 of one embodiment stores the property data that is accessed through the system 100. Such property data includes, but is not limited to the following:

Owner/responsible party/property contact of the property. Such information may include name, contact information, including email and phone number;
Hazards of concern of the property;
Floor plans;
Action plans, including fire action plans;
Inspection reports, including but not limited to fire alarm, sprinkler, emergency lights, fire extinguisher, and other firefighting systems and equipment, and the expiration/due dates of the next inspection;
record documentation;
system record documents;
documents required by NFPA 72;
fire alarm system (FAS) documentation, including but not limited to manuals, the system's test and certified inspection documents, service records, manuals, and AS built documents and drawings;
life safety documents and reports;
building documents;
alarm documents;
sprinkler documents;
signaling system documents;
emergency communications system (ECS) documentation;
Code violations;
Notes of users of the same user type or users in same field;
Pictures, photographs, reports, notes, or other information concerning the property; and
Other data that is relevant.

Such property data is stored within the system 100. The server may store the data. In another embodiment, the data may be stored locally on the user's mobile computing device. The system requires the authorization of the user prior to accessing the property data.

The system authorizes the user by geography and type of user. The system may limit the property data provided to different users. Users may only access specified information. For example, a code official may not need access to an action plan, such as a fire action plan. The code official would not be able to access such action plans. The system limits the user to the data to which the user is authorized.

Identification of the user and application of the rules for accessing the property data may be applied on the mobile computing device 104 or on the server 106. The system 100 identifies the user, authenticates the user, applies the rules, and provides the user with the property data. In one embodiment, the system also allows the user to upload notes, messages, text, pictures, videos, reports, and other information to the server. The system associates the uploaded data with the property so that others can review the data regarding the property.

The system authorizes the user by type and geography. The system then provides the user with the property data authorized to be accessed by the user. The system displays the property data on the mobile computing device 104. The system of one embodiment displays the property data on the application of the mobile computing device 104.

The server of one embodiment may provide the contact information for the property. In one embodiment, the server provides the contact name, the phone number, and the email address. The user may select the phone number or email address to contact the contact person. In another embodiment, the phone number and email address may remain confidential. The application of the mobile computing device allows the user to select phone or email to contact the contact person without displaying the actual phone number and email address.

Figure 2:
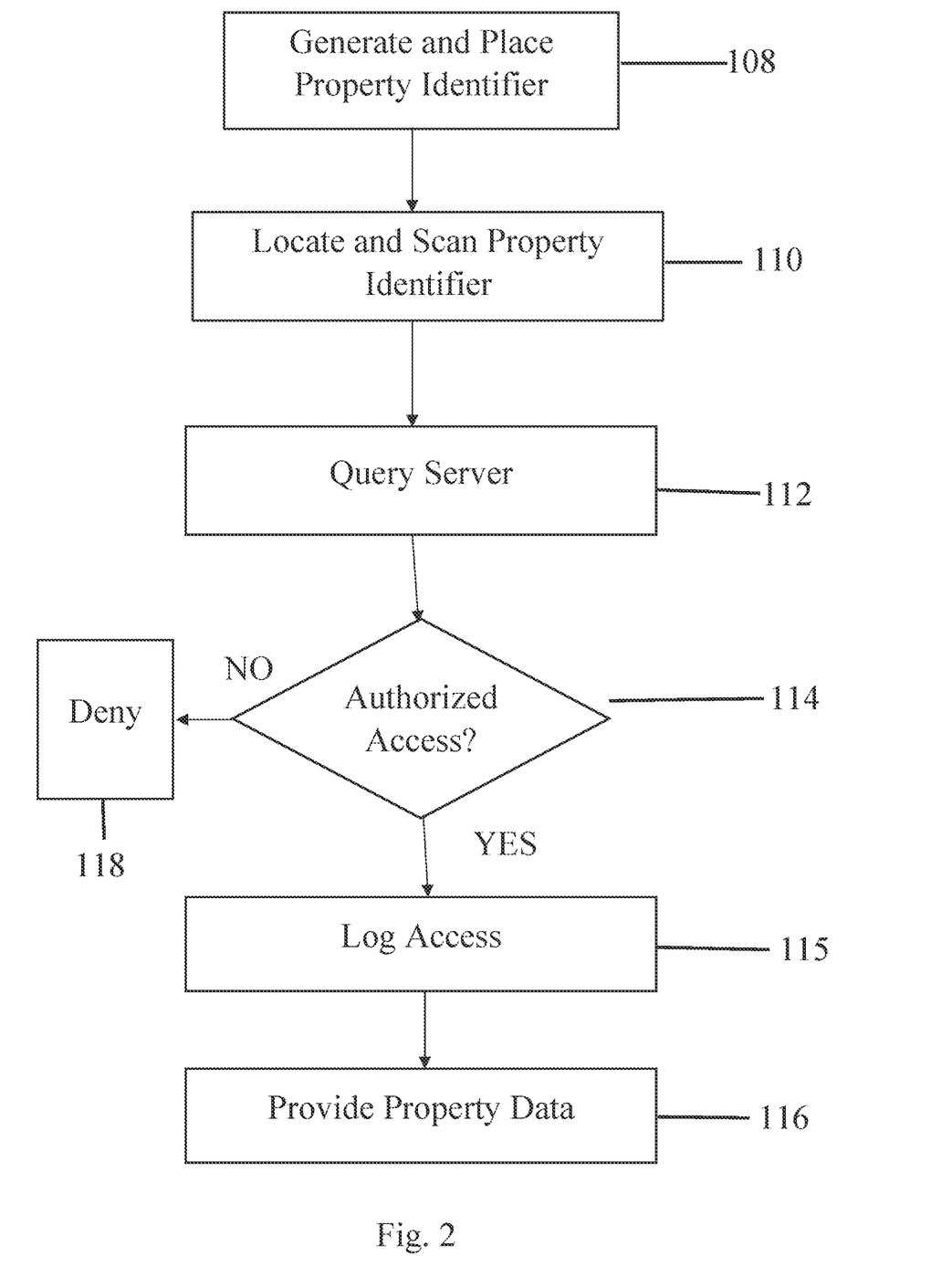
FIG. 2 is a flow chart showing a process of one embodiment of the present invention.

FIG. 2 shows the process of generating and accessing the property data. The system generates a property identifier that is accessible outside of the building or other structure. The property identifier includes the Property ID, such as a bar code, QR code, unique character string, or other machine readable code.

The system generates a property identifier associated with the property. The server associates the property identifier with the property and the property data. The system generates a unique property identifier associated with each property. The property identifier includes a unique Property ID for each property. The property identifier may be more specific such that the property identifier is directed to specific locations and/or structures on the property. The information associated with the property identifier will be directed to those locations and/or structures associated with the property identifier. The server associates the unique Property ID with the property. The server associates the Property ID with the property data.

The system manufactures, produces, prints, creates or otherwise generates the property identifier that is placed accessible on the property without requiring entry into a building, structure, or a locked container at Generate and Place Property Identifier Step 108. The property identifier includes a Property ID.

A person places the property identifier on a window, door, near firefighting equipment and/or systems, or other location at or near the building and/or structure. The person places the property identifier in a location that is accessible to a user outside of the building, near an entrance, at emergency response systems, such as a fire alarm control unit or sprinkler control unit, or other accessible location. Such placement allows the user to scan the property identifier without entering the building, structure, or locked container.

In one embodiment, the person must place the property identifier within a set distance, such as 500 feet from the property. The server may deny access to the property data if the property identifier is not located at the defined location stored by the system/server. The server denies access to the property data if the server detects that the property identifier is scanned outside of the set distance from the defined location.

The system compares a scanned location of the property identifier to the property location associated with the Property ID. In one embodiment, the application captures a scanned location at which the mobile computing device scans the property identifier. The application via the mobile computing device transmits the scanned location to the server. The server can then compare the scanned location to the property location stored within the server to confirm that the user is at the proper address and that the property identifier was properly placed. The server denies access if the property identifier is not located at the defined location identified in the server.

The user locates and scans the property identifier of the property at Locate and Scan Property Identifier Step 110. The Property ID is accessible/viewable from outside the building, structure, or locked container without entering the building or structure or gaining access to a locked container. Such accessibility eliminates the need for the user to enter the building and/or structure or accessing a lockbox or locked container. The user scans the Property ID with the mobile computing device at Locate and Scan Property Identifier Step 110. In one embodiment, the user scans the property identifier through the application running on the mobile computing device. In another embodiment, the user simply scans the property identifier with the mobile computing device. As indicated above, the user scans the property identifier with a camera or bar code reader of the mobile computing device. As discussed above, the application also captures a scanned location identifying the geographic location, such as the address, at which the mobile computing device is located when scanning the property identifier. The mobile computing device, such as through the application, transmits the scanned location to the server. The server then uses the scanned location when confirming the property identifier and confirming any geographic restrictions of the user.

The Property Identifier includes the Property ID of the property. Each Property ID provides a unique identifier for identifying the property within the server and the system. The server associates the property data with the Property ID. Such property data includes:
- Owner/responsible party/emergency contact information. Such information may include name, contact information, including email and phone number;
- Address;
- Hazards of concern of the property;
- Floor plans;
- Action plans, including fire action plans;
- Inspection reports;
- record documentation;
- system record documents;
- fire alarm system (FAS) documentation, including but not limited to manuals, the system's test and certified inspection documents, service records, manuals, and AS built documents and drawings;
- life safety documents and reports;
- building documents;
- alarm documents;
- sprinkler documents;
- signaling system documents;
- emergency communications system (ECS) documentation;
- documents required by NFPA 72;
- Code violations;
- Notes of users of the same user type or users in same field;
- Uploaded data and information from a user that is associated with the Property ID;
- Pictures, photographs, reports, notes, or other information concerning the property; and
- Other data that is relevant The mobile computing device transmits the Property ID to the server to request the property data at Query Server 112. In one embodiment, the address of the server is programmed within the application through which the user scans the property identifier. The application communicates with the server across a communication network, including but not limited to the Internet, WIFI, cellular data. The application provides the address of the server and the user authentication data, such as the login credentials, of the user to the server. In one embodiment, the property identifier provides the address of the server and the Property ID. Scanning the property identifier launches an application that communicates with the server. The system then determines whether the user is authorized to access the property data at Authorized Access Query 114.

The system requires authentication of the user prior to providing the property data. In one embodiment, the mobile computing device transmits the user authentication data, such as the login credentials, to the server. In another embodiment, the user enters the user authentication data. The user authentication data may include login credentials, a User ID, a password, a token, application ID, device ID, an authentication code, or biometric identification.

The server authenticates each user to authorize access to the property data. The system denies access to the user at Deny Access Step 118 if the user is not authorized at Authorized Access Query 114. If the server authorizes the user at Authorized Access Query 114, the system logs access of the user at Log Access Step 115 and provides the property data, such as the property data identified above, at Provide Property Data Step 116.

The server creates a log of the data access. The server of one embodiment creates a log of the user, the user ID, the location, date, time, and the property data accessed by the user. The server may also log any updates, information, or other uploaded data the user transmits to the server. The server may also generate an alert that is sent to the property contact of the accessed property.

Figure 3:
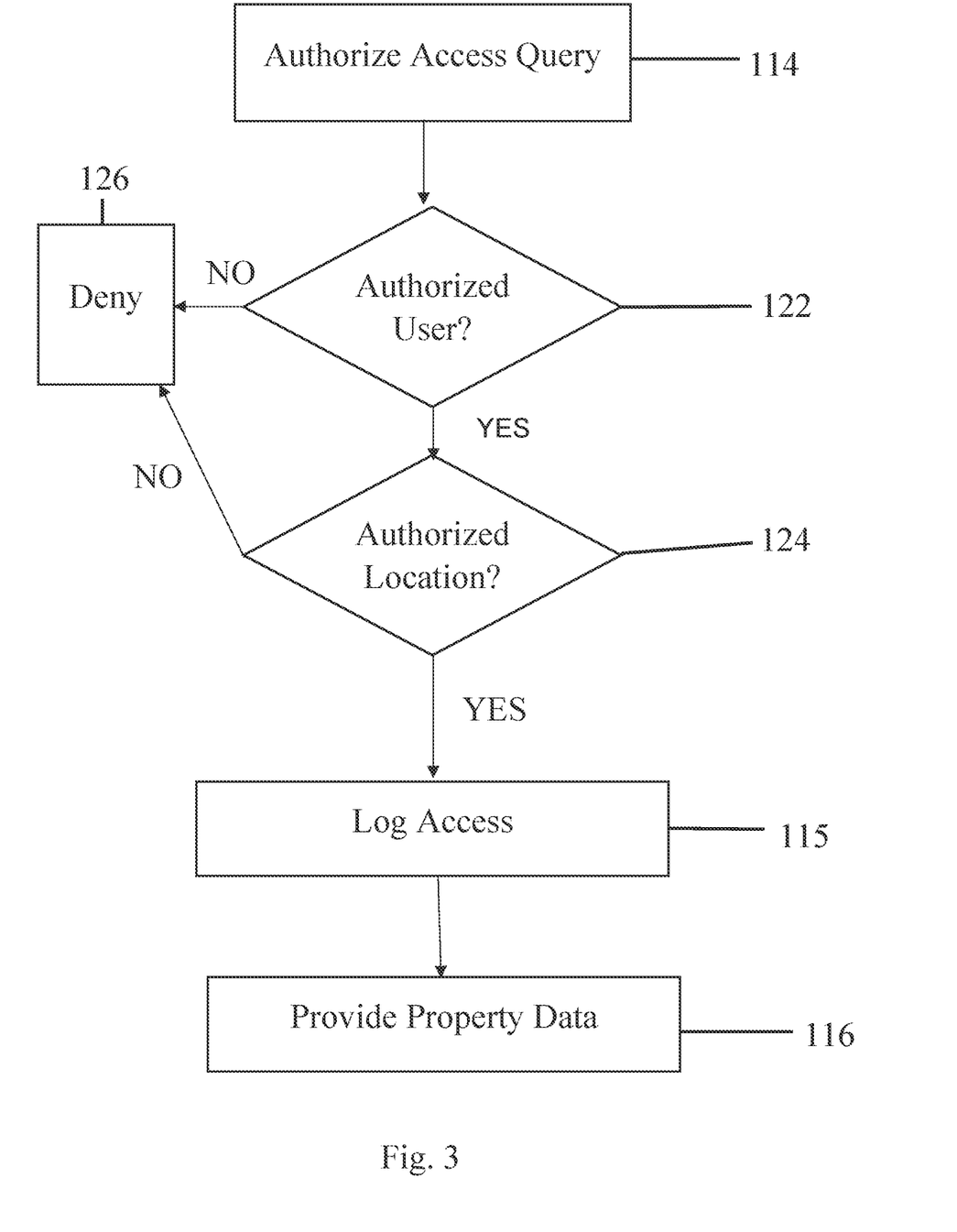
FIG. 3 is a flow chart showing a process of one embodiment of the present invention.

FIG. 3 shows the steps of the system authorizing access to the property data. The system confirms the user and the location of the user prior to providing the user with the property data. The system authorizes the user at Authorize Access Query Step 114.

The system first confirms that the user is an authorized user at Authorized User Query 122. The system confirms that the user has valid credentials to access the property data. The system confirms the identity of the user and authenticates the user. The system authenticates the user via the user authentication data from the mobile computing device, the application, login and password, biometric information, or other methods of authenticating the user as identified above.

The system of one embodiment restricts users to the authorized geographic zones. Each property is located within a geographic zone. The authorized geographic locations, such as the authorized geographic zones, may be identified as particular addresses, neighborhoods, cities, zip codes, counties, states, countries, etc. For example, the system may restrict users to accessing property data of those properties located at particular addresses, neighborhoods, cities, zip codes, counties, states, countries, etc.

The server confirms the authorized geographic locations, such as the authorized geographic zone, of the authenticated user. The authorized geographic locations identify the property data of the properties accessible to the user. The server identifies the property geographic location within which the property is located. The server identifies the property geographic location through the scanned location at which the property identifier is scanned or the property location stored within the server.

The server also confirms that the property geographic zone is within the user's authorized geographic location, such as the zone, at Authorized Location Query 124. In one embodiment, the server confirms the authorized geographic locations, such as the zones.

If the server authorizes the user and the user's access to the property data at Authorized User Query 122 and Authorized Location Query 125, the system logs access of the user at Log Access Step 115 as identified above and provides the property data, such as the property data identified above, at Provide Property Data Step 116.

Otherwise, the system denies access to the property data at Deny Step 126. In one embodiment, the server authenticates the user, authorizes access to the property data, and provides the property data to the user.

Figure 4:
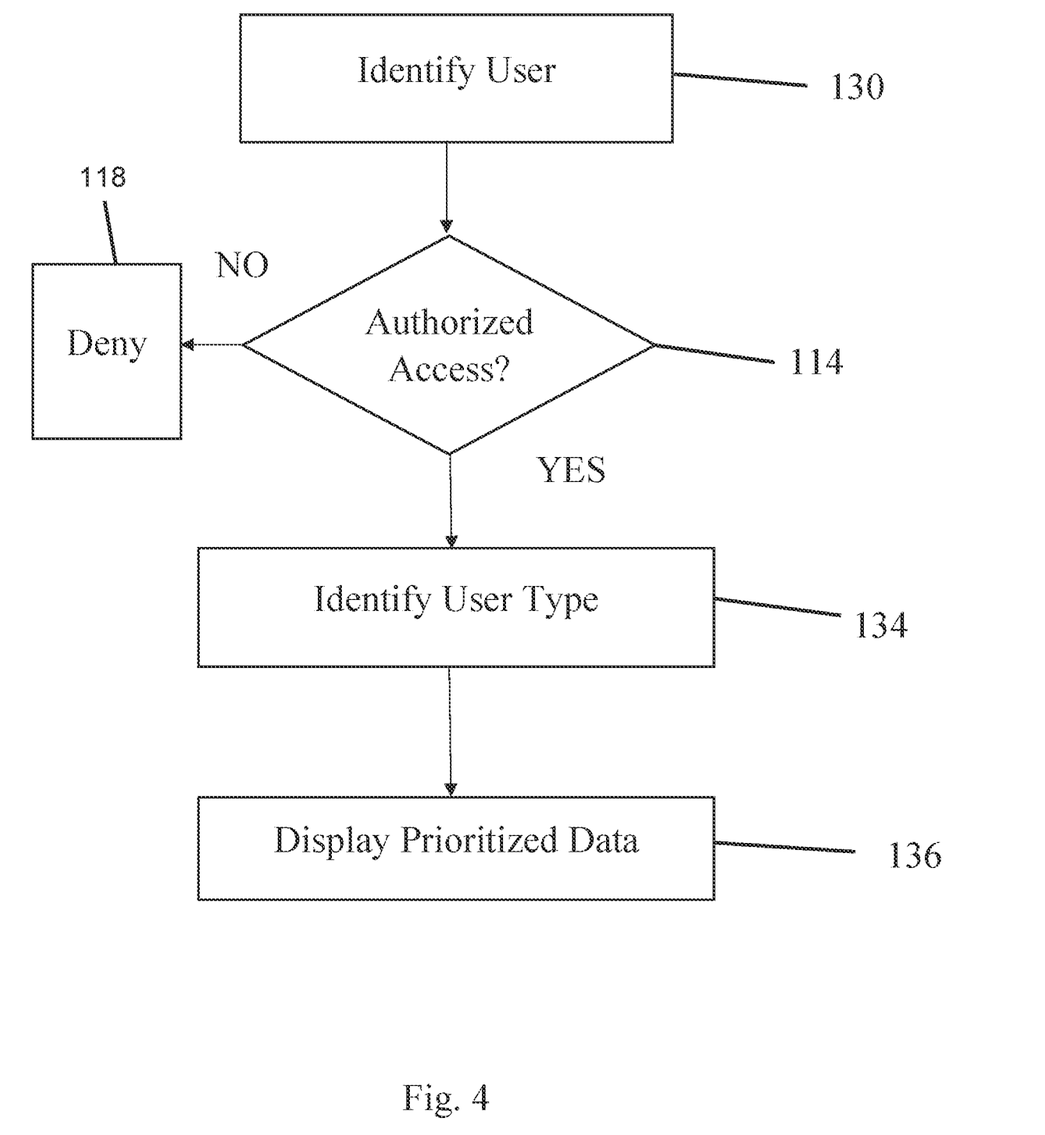
FIG. 4 is a flow chart showing a process of one embodiment of the present invention.

FIG. 4 shows the process of prioritizing data provided to the user. The server designates property data according to user type. The server limits access of the property data to particular user types. The server provides access to the authorized user types. The server denies access to the user types not authorized to receive specific property data.

For example, a code official would not require the fire action plan. The system would deny the code official access to the fire action plan. Similarly, a fireman may not require past code violations. The system would deny access of the past code violations to the fireman.

The server confirms that the user is an authorized user at Authorized Access Query 114 as discussed above. The server also identifies the user type at Identify User Type Step 134. Such user types include, but not limited to: city code officials, fire code officials, police, and fire responders.

The server provides property contact information of a property contact to all authorized users. The property contact identifiers a person to be contacted regarding the property. As discussed above, the server may provide the actual contact information or simply automatically connect the user to the emergency contact.

The server provides fire code officials with information concerning:
  Hazards of the property;
  Sprinkler information;
  Last sprinkler report;
  The fire alarm report;
  The last fire alarm report;
  Fire action plan;
  Floor plan of the property;
  Identification and location of hazardous materials within the property; and
  Identification and location of any firefighting systems and equipment within the property record documentation;
  Documentation required by NFPA 72;
  system record documents;
  fire alarm system (FAS) documentation, including but not limited to manuals, the system's test and certified inspection documents, service records, manuals, and AS built documents and drawings;
  life safety documents and reports;
  building documents;
  alarm documents;
  sprinkler documents;
  signaling system documents;
  emergency communications system (ECS) documentation.

The server provides city code officials and other code officials with information concerning the following:
  Active permits;
  property information;
  Hazards of the property;
  Sprinkler information;
  Last sprinkler report;
  The fire alarm report;
  The last fire alarm report;
  Floor plan of the property;
  Identification and location of any firefighting systems and equipment within the property.

The server provides the police with the emergency contact information, building plans, property layout, or floor plans.

The server provides first responders with information concerning the following:
  Hazards of the property;
  Sprinkler information;
  Last sprinkler report;
  The fire alarm report;
  The last fire alarm report;
  Fire action plan;
  Floor plan of the property;
  Identification and location of hazardous materials within the property; and
  Identification and location of any firefighting systems and equipment within the property; record documentation;
  system record documents;
  documents required by NFPA 72;
  fire alarm system (FAS) documentation, including but not limited to manuals, the system's test and certified inspection documents, service records, manuals, and AS built documents and drawings;
  life safety documents and reports;
  building documents;
  alarm documents;
  sprinkler documents;
  signaling system documents;
  emergency communications system (ECS) documentation.

The server prioritizes the information displayed to the user. For example, a first responder or fire code official accessing the system during an emergency may be interested in the hazards, status of firefighting systems and equipment, floor plan, fire alarm system (FAS) documentation, including but not limited to manuals, the system's test and certified inspection documents, service records, manuals, and AS built documents and drawings, life safety documents and reports, building documents, alarm documents, sprinkler documents, signaling system documents, documentation required by NFPA 72, and emergency communications system (ECS) documentation. Otherwise, the fire code official may be interested in the inspection reports and any violations. A first responder, such as police, security, or medical personnel would access a floor plan or property layout. The mobile computing device displays the prioritized data at Display Prioritized Data Step 136 after the server authenticates the user.

The system provides the users with property data of a property. Such a system allows the user to scan a property identifier accessible outside of the building and/or structure. Such a property identifier may be located at an exit, the exits, fire department connections, etc. The user scans the property identifier with the mobile computing device. The server authenticates the user and transmits the appropriate data to the authenticated user. The system displays the appropriate property data on the mobile computing device.

The system also allows code officials and other users to upload information and other data to the server. The user uploads the uploaded information that includes, but is not limited to, notes, pictures, video, photographs, reports, inspection reports, information, and other data associated with the property.

The system associates the data uploaded by the code official and other users with the property, such as by the Property ID. In one embodiment, the user scans the property identifier to associate the uploaded data with the property. The system may determine the property by the location of the user when uploading the data, the user entering the address, or the user scanning the property identifier of the property with the Property ID. The system may also receive the uploaded data from a computer system of the user. The user may have a separate system that stores the property data to be uploaded. The user's computing system of such an embodiment periodically uploads the uploaded data to the server. The server associates the uploaded information with the Property ID.

Figure 5:
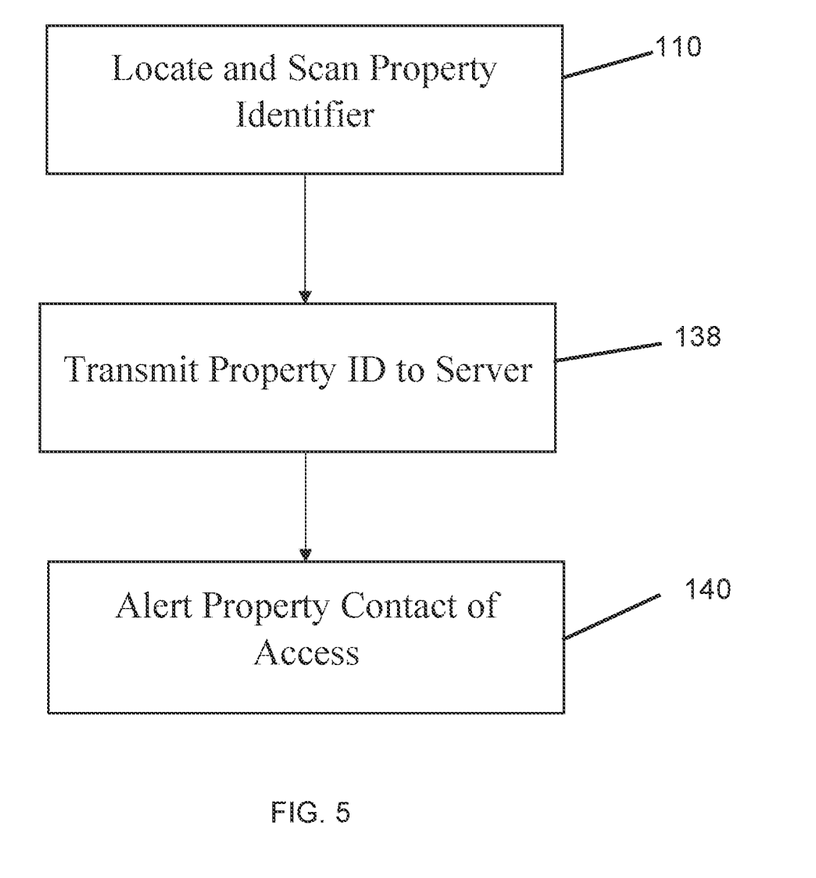
FIG. 5 is a flow chart showing a process of one embodiment of the present invention.

The system also alerts the property contact of a property when a user accesses the property identifier of the property as shown in FIG. 5. The user scans the property identifier as discussed above at Locate and Scan Property Identifier Step 110. Upon scanning the property identifier, the user's mobile computing device transmits the Property ID to the server at Transmit Property ID Step 138. The server identifies the property by the Property ID received from the application and/or mobile computing device. The server then identifies the property contact associated with the property of the Property ID received from the application and/or the mobile computing device. The server then generates and transmits an alert to the property contact at Alert Property Contact Step 140. The server may send the alert by text, alarm on the mobile computing device, phone call, push notification, message, electronic mail, or other alert or alarm that can be detected by the property contact.

The alert indicates the identity of the user and the type of user that transmitted the Property ID of the property to the server. The alert of one embodiment also identifies the time at which the user accessed the property identifier. The alert of one embodiment also includes any information requested and/or accessed by the user.

The system provides information to code officials, first responders, emergency personnel, firemen, police, security, and other service providers. The server provides the property data to a mobile computing device of the authorized users. The user scans a property identifier that includes a Property ID. The mobile computing device transmits the Property ID to the server. The server then transmits the property data associated with the Property ID to the mobile computing device of the authorized user. The server also alerts a property contact associated with the property that a user has accessed the property identifier of the property.

The present invention informs owners or other property contacts of the current status of the property. Such a system also provides users with information in a timely manner to allow the user to quickly and efficiently respond with any action needed for the property.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A system for authenticating a first user on a first mobile computing device and a second user on a second mobile computing device to provide property data concerning a property, the system comprising:
    a property identifier having an image scannable by the first mobile computing device, wherein the property identifier identifies the property;
    a Property ID within the image of the property identifier, wherein the Property ID is unique for the property;
    a server that stores the property data, wherein the server associates the Property ID with the property data, wherein the first mobile computing device transmits the Property ID acquired by scanning the image of the property identifier to the server;
    wherein the second mobile computing device transmits the Property ID acquired by scanning the image of the property identifier to the server;
    wherein the first mobile computing device is associated with a first user type;
    wherein the second mobile computing device is associated with a second user type, wherein the first user type is different than the second user type;
    wherein the server transmits a first set of property data associated with the Property ID to the first user type in response to receiving the Property ID from the first mobile computing device, wherein the first set of property data displayed on the first mobile computing device provides information about the property;
    wherein the server transmits a second set of property data associated with the Property ID to the second user type in response to receiving the Property ID from the second mobile computing device, wherein the second set of property data for the second user type displays differently than the first set of property data for the first user type, wherein the second set of property data displayed on the second mobile computing device provides information about the property.

2. The system of claim 1, wherein the server authenticates the first user prior to transmitting the first set of property data to the first mobile computing device.

3. The system of claim 2, wherein the server confirms that the first user is an authorized user identified by the server prior to transmitting the first set of property data.

4. The system of claim 3, wherein the server associates the property with a geographic location.

5. The system of claim 4, wherein the server restricts the first user to accessing the property data of property located within an authorized geographic location, wherein the server denies access to the property data if the property is not located within the authorized geographic location.

6. The system of claim 1 further comprising:
    an application running on the first mobile computing device, wherein the application transmits the Property ID to the server.

7. The system of claim 6, wherein the application transmits user authentication data to the server to authenticate the first user.

8. The system of claim 1, wherein the server transmits an alert to a property contact after the server receives the Property ID from the first mobile computing device.

9. The system of claim 1, wherein the first set of property data is different than the second set of property.

* * * * *